US008089785B2

(12) United States Patent
Rodriguez

(10) Patent No.: US 8,089,785 B2
(45) Date of Patent: Jan. 3, 2012

(54) POWER CONDITIONING UNIT

(75) Inventor: Cuauhtemoc Rodriguez, Cambridge (GB)

(73) Assignee: Enecsys Limited, Cambridge (GB)

( * ) Notice: Subject to any disclaimer, the term of this patent is extended or adjusted under 35 U.S.C. 154(b) by 173 days.

(21) Appl. No.: 12/160,743

(22) PCT Filed: Jan. 12, 2007

(86) PCT No.: PCT/GB2007/050014
§ 371 (c)(1),
(2), (4) Date: May 4, 2010

(87) PCT Pub. No.: WO2007/080429
PCT Pub. Date: Jul. 19, 2007

(65) Prior Publication Data
US 2010/0214808 A1 Aug. 26, 2010

(30) Foreign Application Priority Data
Jan. 13, 2006 (GB) .................................. 0600658.9

(51) Int. Cl.
H02J 3/38 (2006.01)
(52) U.S. Cl. .............................. 363/35; 323/906; 363/16
(58) Field of Classification Search .................. 323/207, 323/906; 363/16, 131, 35
See application file for complete search history.

(56) References Cited

U.S. PATENT DOCUMENTS

| 5,329,222 | A | 7/1994 | Gyugyi et al. |
| 5,381,327 | A * | 1/1995 | Yan ................................. 363/24 |
| 6,058,035 | A | 5/2000 | Madenokouji et al. |
| 6,081,104 | A | 6/2000 | Kern |
| 6,657,419 | B2 | 12/2003 | Renyolds |
| 6,678,174 | B2 | 1/2004 | Suzui et al. |
| 6,950,323 | B2 | 9/2005 | Achleitner et al. |
| 7,031,176 | B2 | 4/2006 | Kotsopoulos et al. |
| 7,064,967 | B2 | 6/2006 | Ichinose et al. |
| 7,078,883 | B2 | 7/2006 | Chapman et al. |

(Continued)

FOREIGN PATENT DOCUMENTS

DE 10064039 A 12/2001

(Continued)

OTHER PUBLICATIONS

Martins, et al.: *"Interconnection of a Photovoltaic Panels Array to a Single-Phase Utility Line From a Static Conversion System"*; Power Electronics Specialists Conference, 2000. PESC 00. 2000 IEEE 31$^{st}$ Annual; Jun. 18, 2000-Jun. 23, 2000; ISSN: 0275-9306; pp. 1207-1211, vol. 3.

(Continued)

*Primary Examiner* — Shawn Riley

(57) ABSTRACT

A photovoltaic power conditioning unit for delivering power from a dc photovoltaic power source to an ac mains power supply is disclosed. The photovoltaic power conditioning unit may include a non-electrolytic energy storage capacitor, a dc-to-dc converter having an input connection coupled to an input and an output connection coupled to the energy storage capacitor. The photovoltaic power conditioning unit also may include a dc-to-ac converter having an input connection coupled to the energy storage capacitor and an output connection coupled to an output and a power injection control block configured to control an amount of power transferred from the dc-to-ac converter to the ac mains power supply based, at least in part, on an amplitude of a fluctuating sinusoidal component of a dc voltage on the non-electrolytic energy storage capacitor.

20 Claims, 4 Drawing Sheets

U.S. PATENT DOCUMENTS

| | | |
|---|---|---|
| 7,099,169 B2 | 8/2006 | West et al. |
| 7,193,872 B2 * | 3/2007 | Siri ................................. 363/95 |
| 7,262,979 B2 | 8/2007 | Wai et al. |
| 7,319,313 B2 | 1/2008 | Dickerson et al. |
| 7,324,361 B2 * | 1/2008 | Siri ................................. 363/95 |
| 7,414,870 B2 | 8/2008 | Röttger et al. |
| 7,450,401 B2 | 11/2008 | Iida |
| 7,463,500 B2 | 12/2008 | West |
| 7,479,774 B2 | 1/2009 | Wai et al. |
| 7,885,085 B2 * | 2/2011 | Orr et al. .................... 363/21.02 |
| 2004/0117676 A1 | 6/2004 | Kobayashi et al. |
| 2005/0030772 A1 | 2/2005 | Phadke |
| 2005/0068012 A1 | 3/2005 | Cutler |
| 2005/0242795 A1 | 11/2005 | Al-Kuran et al. |
| 2006/0232220 A1 | 10/2006 | Melis |
| 2007/0035975 A1 | 2/2007 | Dickerson et al. |
| 2008/0205096 A1 * | 8/2008 | Lai et al. ......................... 363/40 |
| 2008/0285317 A1 | 11/2008 | Rotzoll |
| 2008/0291707 A1 | 11/2008 | Fang |
| 2008/0304296 A1 | 12/2008 | NadimpalliRaju et al. |
| 2008/0304298 A1 | 12/2008 | Toba et al. |
| 2009/0097283 A1 | 4/2009 | Krein et al. |
| 2010/0195361 A1 | 8/2010 | Stem |

FOREIGN PATENT DOCUMENTS

| | | |
|---|---|---|
| EP | 0 947 905 A2 | 10/1999 |
| EP | 1235339 A | 8/2002 |
| WO | WO 96/07130 A | 3/1996 |
| WO | WO 2004/006342 A | 1/2004 |
| WO | WO 2004/008619 A2 | 1/2004 |
| WO | WO 2005/015584 A2 | 2/2005 |
| WO | WO 2009/134756 A1 | 11/2009 |

OTHER PUBLICATIONS

Kimball, et al.: "*Analysis and Design of Switched Capacitor Converters*"; Grainger Center for Electric Machinery and Electromechanics, University of Illinois at Urbana-Champaign, 1406 W. Green St, Urbana, IL 61801 USA, © 2005 IEEE; pp. 1473-1477.

International Search Report for corresponding PCT/GB2007/050014 completed Jan. 15, 2008 by Michael Lund of the EPO.

Search Report for corresponding GB 1009430.8, date of search: Dec. 9, 2010.

Kotsopoulos, et al.: "*Predictive DC Voltage Control of Single-Phase PC Inverters with Small DC Link Capacitance*", IEEE Intn'l Symposium 2003, pp. 793-797.

* cited by examiner

POWER CONDITIONING UNIT

The present invention relates to a power conditioning unit for delivering power from a dc power source to an ac output, particularly suitable for ac voltages greater than 50 volts, either for connecting directly to the mains or grid utility supply, or for powering mains devices directly, independent from the mains utility supply.

A number of power electronics converters have been produced in the past for research or commercial purposes, see for example EP0780750, EP0947905, and JP2000020150. In these solutions a capacitor is used as a reservoir and for filtering of high-frequency currents. Further information may be found in US2005/0068012, JP05003678, GB2415841 and WO2006/011071. However, attention is not directly paid into the choice of capacitor and the control of energy input and output. It is common to encounter aluminium electrolytic capacitors in power supplies. These capacitors have lifetimes in the range of 2000 to 12000 hours, that is, up to 1.4 years of continuous service. In contrast other capacitor technologies, such as polyester, can achieve lifetimes of up to 500,000 hours or slightly more than 50 years. Therefore, it would be advantageous to provide a better lifetime of the power converter by using polyester or polypropylene capacitor. This is possible with the method of energy control explained herein.

We will describe a method to control direct current energy sources, in particular a method to control direct current energy sources that utilise power electronics converters to condition the input power into alternating current electricity that is supplied to the mains. Such power electronics converter comprises of a plurality of conversion stages and one energy reservoir in the form of a capacitor. The method presented allows the utilisation of long-lifetime polyester or polypropylene capacitors as opposed to short-lifetime electrolytic capacitors. The method consists of two control algorithms: one algorithm controls the power extracted from the energy source that is supplied to the energy reservoir and another controls the transfer of power from the reservoir into the electricity mains. We will describe controlling the voltage in the energy reservoir, as opposed to the supply voltage, which in turn controls the energy transfer. We will describe energy being supplied to the reservoir from the source (PV panel). To release that energy the voltage variation in the reservoir is used to define a current amplitude. We will describe how energy is stored in the power converter (in the energy reservoir) and how to use that energy to define a current injection into the mains.

According to an aspect of the invention, there is provided a power conditioning unit for delivering power from a dc power source to an ac mains power supply output, the power conditioning unit comprising an input for receiving power from said dc power source, an output for delivering ac power, an energy storage capacitor, a dc-to-dc converter having an input connection coupled to said input and an output connection coupled to the energy storage capacitor, and a dc-to-ac converter having an input connection coupled to said energy storage capacitor and an output connection coupled to said output, wherein said energy storage capacitor has a capacitance of less than twenty microfarads.

The ac mains power supply output may be connected to the utility grid, so that the power conditioning unit delivers power into the grid, or it may be a standalone power supply output for supplying power to electrical appliances.

The dc-to-dc converter may be configured to draw a substantially constant power from the dc power source regardless of a voltage on the energy storage capacitor. It may be configured to perform maximum power point tracking (MPPT) of the dc power source, and this may be achieved by maintaining a voltage or current from the dc power source substantially at a reference voltage or current. This may comprise controlling transistors in the dc-to-dc converter responsive both to the voltage or current from the dc power source and to a voltage or current to the energy storage capacitor.

The dc-to-ac converter may be configured to deliver a substantially sinusoidal current or voltage to the ac mains power supply output regardless of a voltage on the energy storage capacitor. This may be achieved by maintaining a current or voltage to the power supply output substantially at a reference sinusoid current or voltage. This may comprise controlling transistors in the dc-to-ac converter responsive both to a voltage or current from the energy storage capacitor and to the current or voltage to the power supply output.

The energy storage capacitor may comprise a non-electrolytic capacitor such as a film-type capacitor (for example polyester or polypropylene). The value of the capacitance may be directly proportional to the maximum power transfer capability, that is, the rated power of the apparatus. This value may be lower than an equivalent electrolytic capacitor in a conventional power conditioning unit with the same power rating. For example, less than 20 microfarads, less than 15 microfarads, less than 10 microfarads, less than 5 microfarads or another size available for a non-electrolytic capacitor.

According to another aspect of the invention, there is provided a dc-to-dc converter for delivering power from a dc power source to a dc output, the converter being configured to maintain a voltage on the dc power source substantially constant over a range of dc output voltages, the converter comprising an input for receiving power from said dc power source, an output for delivering dc power, at least one power device for transferring power from the input to the output, a sensing circuit for sensing a voltage on said input, and a driver circuit for driving said at least one power device responsive to said sensing to control said power transfer.

According to a further aspect of the invention, there is provided an inverter for delivering power from a dc power source to an ac output, the inverter being configured to maintain a substantially sinusoidal output voltage or current over a range of dc power source voltages, the inverter comprising an input for receiving power from said dc power source, an output for delivering ac power, at least one power device for transferring power from the input to the output, a low-pass filter coupled to said input, a sensing circuit for sensing an output from the low-pass filter and comparing with a reference, and a driver circuit for driving said at least one power device responsive to said sensing to control said power transfer.

According to a yet further aspect of the invention, there is provided a power conditioning unit for delivering power from a dc power source to an ac mains power supply output, wherein a link capacitor of the power conditioning unit connected in parallel between an output of a dc-to-dc converter of said power conditioning unit and an input of a dc-to-ac converter of said power conditioning unit is not an electrolytic capacitor.

According to another aspect of the invention, there is provided a method to control a power conditioning unit for delivering power from a dc source into the electricity supply, the power conditioning comprising the following: a plurality of inputs for connecting the dc power source, a plurality of output for connecting into the electricity supply, a power conversion stage for voltage conditioning of the dc power source, a power conversion stage for power injection into the electricity supply, a dc capacitor for energy buffering from the dc power source to the electricity supply.

Embodiments of the invention will now be described in detail, with reference to the accompanying drawings, in which.

The present invention relates to a method of controlling the transfer of power from a dc energy source, such as a solar panel, fuel cell, dc wind turbine, etc, into the electricity mains supply, and in particular, this method allows the replacement of short-lifetime energy reservoirs for long-lifetime polyester or polypropylene capacitors.

Figure 1:
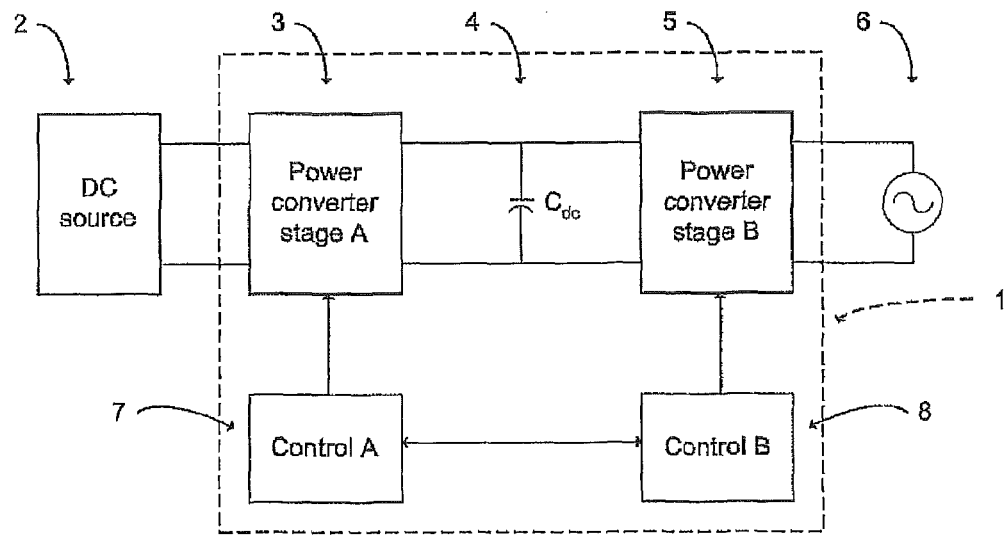
FIG. 1 shows a dc to ac system according to the present invention.

The energy control method can be used in any power electronics converter device (1) as shown in FIG. 1. This apparatus (1) is made of three major elements: a power converter stage A (3), one reservoir capacitor $C_{dc}$ (4), and one power converter stage B (5). The apparatus (1) has a plurality of inputs connected to a direct current (dc) source, such as a solar or photovoltaic panel array (2) comprising one or more dc sources connected in series and/or in parallel. The apparatus (1) is also connected to the electricity supply (6) so that the energy extracted from the dc source (1) is transferred into the mains (6).

The power converter stage A (3) may be of different types: it can be a step-down converter where the voltage at the input is decreased using some power electronics topology; it can be a step-up converter where the input voltage is amplified using a different type of power electronics circuit; or it can do both amplify and attenuate the input voltage. In addition, it may provide electrical isolation by means of a transformer or a coupled inductor. In whatever case, the electrical conditioning of the input voltage must be such that the voltage across the capacitor $C_{dc}$ (4) remains higher than the grid voltage (6) magnitude at all times. Also, this block contains one or more transistors, inductors, and capacitors. The transistor(s) are driven through a pulse width modulation (PWM) generator. The PWM signal(s) have variable duty cycle, that is, the ON time is variable with respect to the period of the signal. This variation of the duty cycle effectively controls the amount of power transferred across the power converter stage A (3).

The power converter stage B (5) injects current into the electricity supply (6). Therefore, the topology utilises some means to control the current flowing from the capacitor $C_{dc}$ (4) into the mains (6). The circuit topology can be either a voltage source inverter or a current source inverter.

Figure 2:
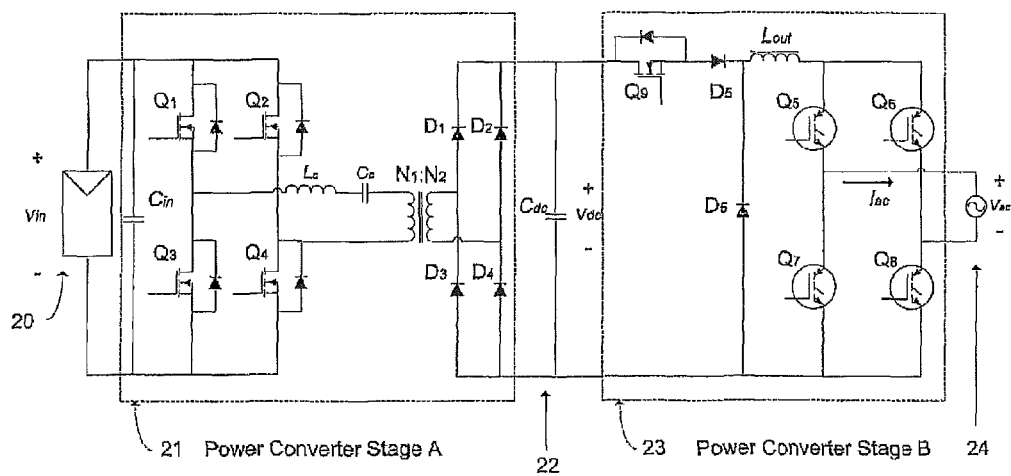
FIG. 2 shows an example of a power conditioning unit suitable for control by the system of FIG. 1.

FIG. 2 shows an example of a power conditioning unit to which the control system of FIG. 1 may be applied. Control A (7 in FIG. 1) may be connected to the input connections (e.g. gates or bases) of transistors in power converter stage A (21) to control the transfer of power from the dc energy source (20). The input of this stage is connected to the dc energy source and the output of this stage is connected to dc link capacitor 22. This capacitor stores energy from the dc energy source for delivery to the mains supply (24). Control A may be configured to draw a substantially constant power from the dc energy source regardless of the dc link voltage $V_{dc}$ on $C_{dc}$.

Control B (8 in FIG. 1) may be connected to the input connections of transistors in power converter stage B (23) to control the transfer of power to the mains supply. The input of this stage is connected to the dc link capacitor and the output of this stage is connected to the mains supply. Control B may be configured to inject a substantially sinusoidal current into the mains supply regardless of the dc link voltage $V_{dc}$ on $C_{dc}$.

Figure 3:
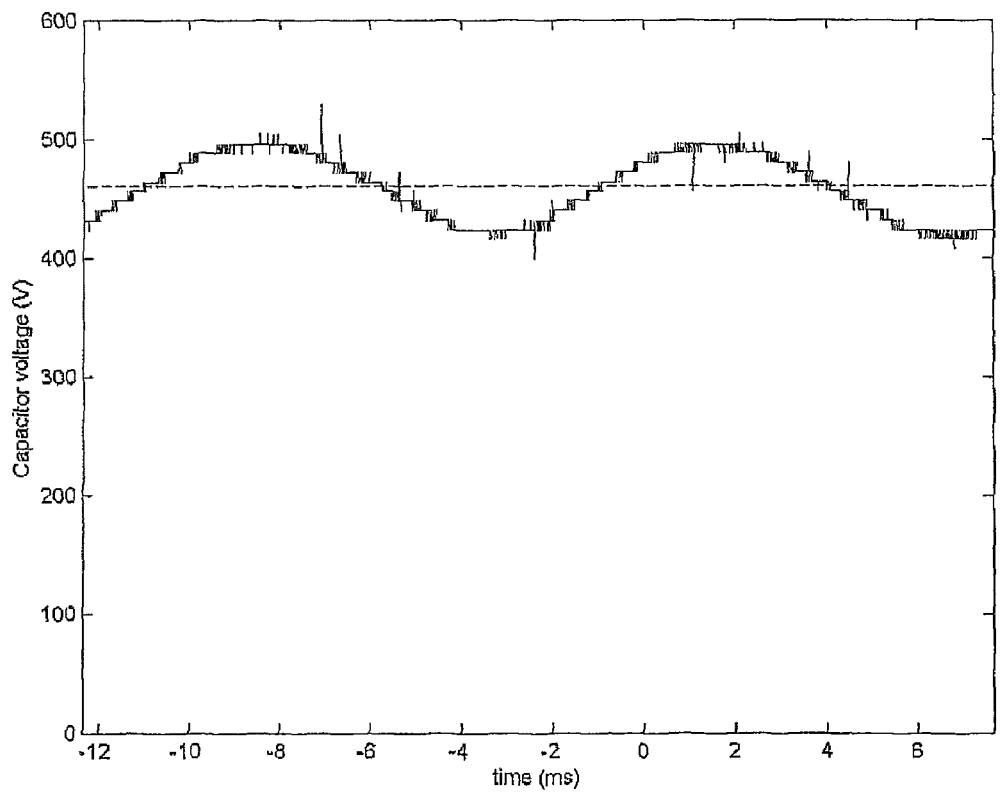
FIG. 3 shows DC capacitor voltage according to the present invention.

The capacitor $C_{dc}$ (4) acts as an energy buffer from the input to the output. Energy is supplied into the capacitor via the power stage A (3) at the same time that energy is extracted from the capacitor via the power stage B (5). The current invention provides a control method that balances the average energy transfer and allows a voltage fluctuation, resulting from the injection of ac power into the mains (6), superimposed to the average dc voltage of the capacitor $C_{ac}$ (4), as shown in FIG. 3. The figure shows an average voltage of 475V and a 100 Hz fluctuation of peak amplitude of 30V. The peak amplitude depends on the amount of power being transferred from the input (2 in FIG. 1) to the output (6). The frequency of the oscillation can be either 100 Hz or 120 Hz depending on the line voltage frequency (50 Hz or 60 Hz respectively).

Two synchronised and independent control blocks control the system (1): a control block A (7) that directly controls the power stage A (3), and a control block B (8) that directly controls the power stage B (5).

Figure 4:
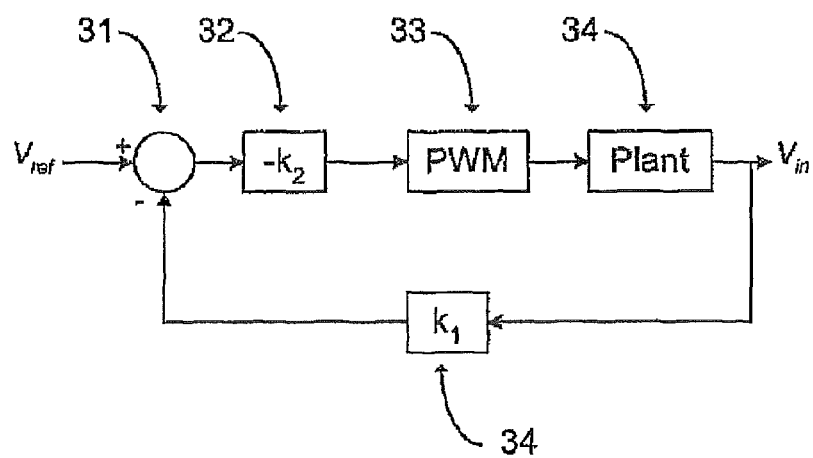
FIG. 4 shows control block A according to the present invention.

Control block A (7) has the configuration shown in FIG. 4. It comprises an adder (31), a negative proportional gain (32), a PWM generator (33), the system plant (34), and a feedback gain (35). This control block regulates the voltage across the dc source (2). This voltage, $v_{in}$, is measured and adjusted by gain $k_1$ (35). It is then subtracted to a voltage reference, $v_{ref}$, using the adder (31). The error, $(v_{ref}-k_1 v_{in})$, is then amplified by a factor of $-k_2$. The resulting signal is negatively proportional to the error. Therefore, a positive error generates a decrement in the driving signal and conversely. This driving signal is input to a PWM generator (33) that can be a microcontroller, or a PWM integrated circuit. This block generates digital pulses that, in turn, drive the transistors of the power stage A (3) that is equivalent to the plant (34).

Figure 5:
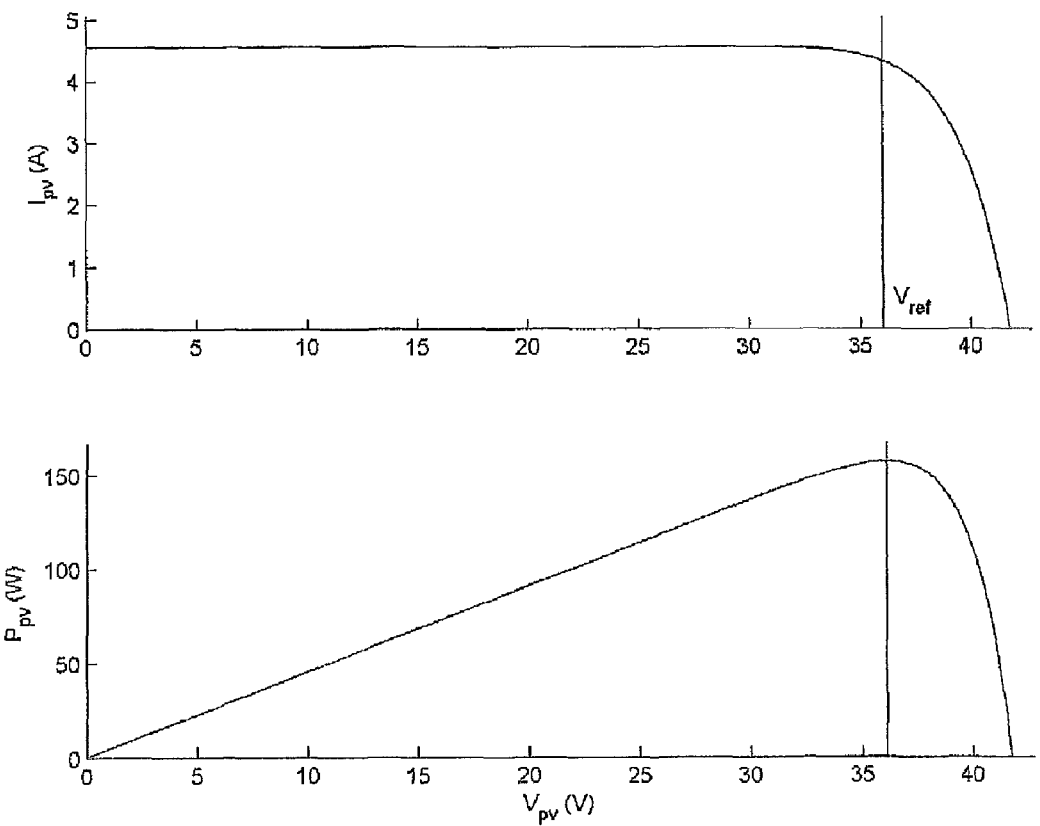
FIG. 5 shows characteristics of photovoltaic panel array as known in the art.

Controlling the dc source (2) voltage directly controls the power being transferred across power stage A (3) as is shown in FIG. 5 for a photovoltaic panel array.

Figure 6:
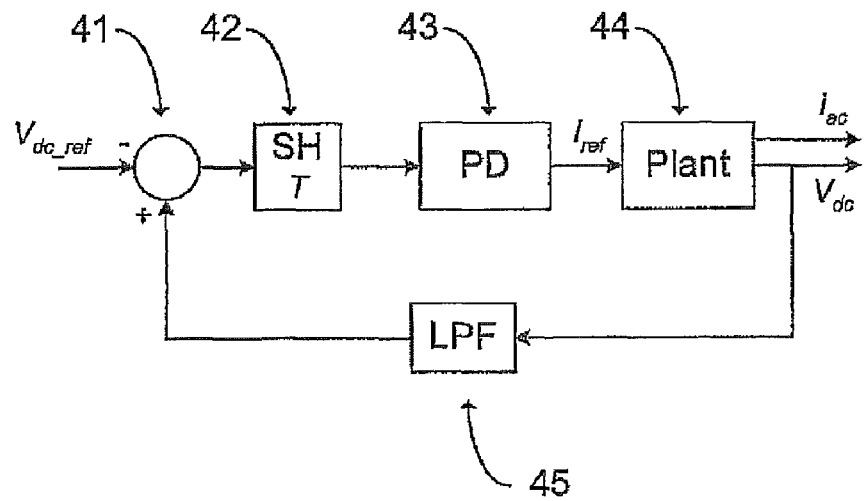
FIG. 6 shows control block B according to the present invention.

Control block B (8) has the configuration shown in FIG. 6. It composes of an adder (41), a sample and hold (SH) with period T block (42), a proportional-derivative (PD) compensator (43), the system plant (44), a low-pass filter (LPF) feedback block (45). This control block regulates the average voltage across capacitor $C_{dc}$ (4). Because the voltage, $v_{dc}$, contains the sum of a constant voltage and a fluctuating sinusoidal component, the signal is scaled and filtered using the LPF block (45). This generates a constant voltage that is compared against a reference, $v_{dc\_ref}$, using adder (41). The error is measured every T seconds using a Sample and Hold, SH, block (42). The resulting sampled error is forwarded to a PD compensator (43) that sets the amplitude of the current injected to the mains (6) via power stage B (5). The update of this current reference, $I_{ref}$, amplitude is done every T seconds, which is the inverse of the line voltage frequency. Hence, it can take the values of 0.02 or 0.0167 seconds for a line frequency of 50 or 60 Hz respectively. This is needed in order to prevent current injection distortion.

Figure 7:
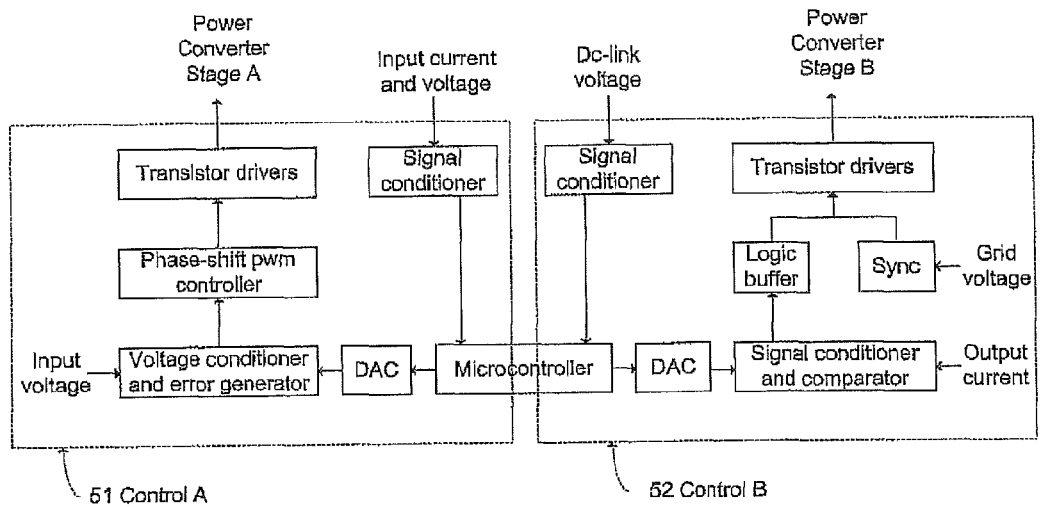
FIG. 7 shows an exemplary implementation of control blocks A and B according to the present invention.

An implementation of control blocks A and B is shown in FIG. 7. Both blocks operate independently but share a common microcontroller for simplicity. The microcontroller performs the control strategy depicted in FIG. 6 for block B. In addition the microcontroller could incorporate some means of maximum power point tracking control in case the input source is a photovoltaic panel in block A in order to generate a reference input voltage used in FIG. 4. Consequently the input voltage and current and the dc-link voltage are fed into the microcontroller via an arrangement of operational amplifiers or signal conditioning blocks.

The control shown in FIG. 4 for block A is implemented using analogue electronics in the form of operational amplifiers and the phase-shift pwm controller depicted in FIG. 7 (51). As mentioned before, the input voltage reference is obtained through the microcontroller via a digital to analogue converter (DAC). The proportional error is obtained inside the phase-shift pwm controller that, in turn, generates pwm signals for the transistors of stage A (21).

Implementation of control B (52) includes a current transducer that senses the rectified output current. This signal is conditioned to appropriate voltage levels using operational amplifiers and is then compared against a reference current. The reference current is generated in the microcontroller by an algorithm shown in FIG. 6 and the resulting digital word is sent to a DAC in order to get an analogue, instantaneous, current reference. Changes to the current magnitude are done in a periodic basis (with period equal to the grid voltage period) in order to avoid current distortion. The result of the comparison between the reference and the actual current is buffered through a D flip-flop which, in turn, drives transistor Q9 in FIG. 2. Transistors Q5-Q8 form a full-bridge that switches at line frequency using an analogue circuit synchronised with the grid voltage. Transistors Q5 and Q8 are on during the positive half cycle of the grid voltage and Q6 and Q7 are on during the negative half cycle of the grid voltage.

Figure 8:
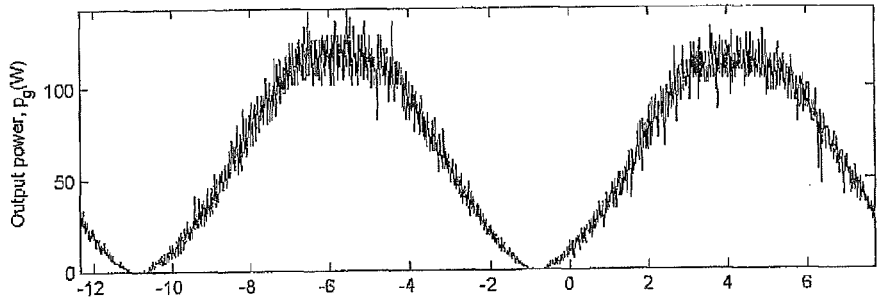
FIG. 8 shows output and input powers according to the present invention.
Figure 8:
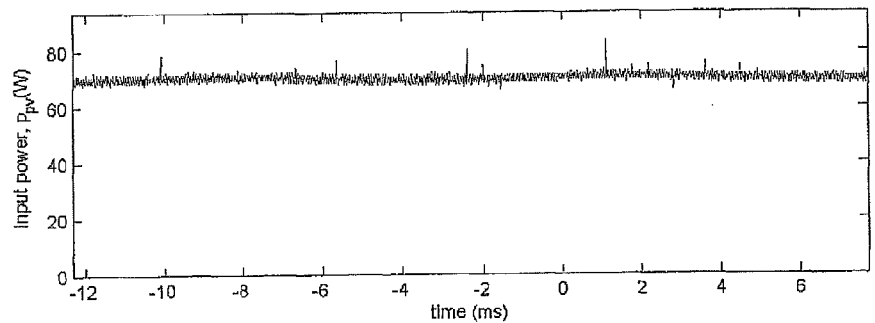

FIG. 8 shows the output and input powers using the aforementioned control. Clearly, the instantaneous power output is a sinusoid superimposed to an average positive value. In contrast, the input is constant throughout the period of the line voltage. The power difference creates and energy mismatch that is absorbed in capacitor $C_{dc}$. This effectively appears as a fluctuation across the capacitor, as is shown in FIG. 3.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A photovoltaic power conditioning unit for delivering power from a dc photovoltaic power source to an ac mains power supply, the photovoltaic power conditioning unit comprising:
    an input for receiving power from said dc power source;
    an output for delivering ac power;
    an non-electrolytic energy storage capacitor;
    a dc-to-dc converter having an input connection coupled to said input and an output connection coupled to the energy storage capacitor;
    a dc-to-ac converter having an input connection coupled to said energy storage capacitor and an output connection coupled to said output; and
    a power injection control block configured to control an amount of power transferred from said dc-to-ac converter to said ac mains power supply based at least in part on an amplitude of a fluctuating sinusoidal component of a dc voltage on said energy storage capacitor.

2. A photovoltaic power conditioning unit according to claim 1, wherein said dc-to-dc converter comprises:
    at least one power device for transferring power from the input connection of the dc-to-dc converter to the output connection of the dc-to-dc converter;
    a sensing circuit for sensing a voltage on said input connection; and
    a driver circuit for driving said at least one power device responsive to said sensing to control said power transfer.

3. A photovoltaic power conditioning unit according to claim 2, wherein the dc-to-dc converter further comprises a reference voltage generator, and wherein the driver circuit is configured to substantially minimise a difference between the reference voltage and the sensed voltage.

4. A photovoltaic power conditioning unit according to claim 1, wherein said dc-to-ac converter comprises:
    at least one power device for transferring power from the input connection of the dc-to-ac converter to the output connection of the dc-to-ac converter;
    a low-pass filter coupled to said input connection;
    a sensing circuit for sensing an output from the low-pass filter and comparing with a reference; and
    a driver circuit for driving said at least one power device responsive to said sensing to control said power transfer.

5. A photovoltaic power conditioning unit according to claim 4, wherein the driver circuit is configured to substantially minimise a difference between the output from the low-pass filter and the reference.

6. A photovoltaic power conditioning unit according to claim 4, wherein the sensing circuit is configured to sense an output voltage from said low-pass filter and compare with a reference voltage.

7. A photovoltaic power conditioning unit according to claim 4, wherein the sensing circuit is configured to periodically compare said output from the low-pass filter with said reference.

8. A photovoltaic power conditioning unit according to claim 7, wherein the sensing circuit is configured to periodically compare said output from the low-pass filter with said reference in synchronisation with the ac output.

9. A photovoltaic power conditioning unit according to claim 1, wherein said energy storage capacitor has a capacitance of less than 15 microfarads.

10. A photovoltaic power conditioning unit according to claim 1, wherein said energy storage capacitor comprises a film-type capacitor.

11. A photovoltaic power conditioning unit comprising:
    a non-electrolytic energy storage capacitor;
    a dc-to-ac converter having an input connection coupled to said energy storage capacitor and an output connection coupled for delivering ac power to an ac mains power supply; and
    a power injection control block to control said dc-to-ac converter, wherein said power injection control block is configured to control an amplitude of an ac current provided to said ac mains power supply such that an amount of power transferred to said ac mains power supply is dependent on a peak amplitude of a fluctuating sinusoidal component of a dc voltage on said energy storage capacitor.

12. A control method for controlling a photovoltaic power conditioning unit for delivering power from a dc photovoltaic power source into an ac electricity supply, the method comprising:
    inputting dc power from a dc power source;
    voltage conditioning said dc power from said dc power source using a dc-to-dc power conversion stage;
    injecting power into the said ac electricity supply from a dc-to-ac power conversion stage;

coupling power from said dc-to-dc power conversion stage to said dc-to-ac power conversion stage via a dc link;

buffering energy from said dc power source to said electricity supply using a non-electrolytic dc link energy storage capacitor connected in parallel between an output of said dc-to-dc converter and an input of said dc-to-ac converter; and controlling said dc-to-ac converter power conversion stage to control an amount of power transferred to said ac electricity supply based, at least in part, on a fluctuating sinusoidal component of the non-electrolytic dc link energy storage capacitor.

13. A control method as claimed in claim 12 comprising controlling said first and second power conversion stages using two control blocks, using a first control block controlling the first dc-to-dc power conversion stage for voltage conditioning from said dc power source to the energy storage capacitor for energy buffering, and using a second control block for controlling said second, dc-to-ac power conversion stage for controlling power injection into the ac electricity supply.

14. A control method as claimed in claim 13, wherein said voltage conditioning comprises controlling said first control block for said first power conversion stage to maintain a voltage at input terminals of the dc power source constant, hence maintaining a constant flow of power from said dc power source into said non-electrolytic dc link energy storage capacitor.

15. A control method as claimed in claim 12, further comprising maintaining an average voltage on said non-electrolytic dc link energy storage capacitor constant by adjusting the amplitude of current injection into said ac electricity power supply by controlling said second control block controlling said dc-to-ac power conversion stage.

16. A control method as claimed in claim 15, further comprising controlling a sinusoidal shape of said current injection into said ac electricity supply by controlling said second control block controlling said dc-to-ac power conversion stage.

17. A control method as claimed in claim 15, further comprising sensing a voltage across said non-electrolytic dc link energy storage capacitor; conditioning the resulting signal using a Low Pass Filter (LPF); and controlling said second control block controlling said dc-to-ac power conversion stage using said resulting signal.

18. A control method as claimed in claim 17, further comprising comparing a result of said signal conditioning to a reference to generate an error signal, sampling said error signal at periodic intervals, and using said sampled error signal for controlling said second control block controlling said dc-to-ac power conversion stage.

19. A control method as claimed in claim 12, further comprising controlling the transfer of power from the dc power source into the electricity supply while maintaining the voltage and power of the dc power source constant by controlling a sinusoidal current injection into the electricity supply, whilst allowing a sinusoidal fluctuation on the average voltage across said non-electrolytic dc link energy storage capacitor.

20. A method as claimed in claim 12, the method further comprising controlling said first, dc-to-dc power conversion stage to regulate a voltage of said dc power source to control power extracted from said dc power source to said energy storage capacitor.

* * * * *